United States Patent [19]

Huffman et al.

[11] 4,112,169

[45] Sep. 5, 1978

[54] ELASTOMER MODIFIED MELAMINE RESIN CONTAINING LAMINATES

[75] Inventors: Kenneth Robert Huffman, Stamford; Donald James Casey, Ridgefield; Walter Moreland Thomas, Darien, all of Conn.

[73] Assignee: Formica Corporation, Cincinnati, Ohio

[21] Appl. No.: 767,718

[22] Filed: Feb. 11, 1977

[51] Int. Cl.² .................. B32B 27/42; B32B 3/10; B32B 5/16
[52] U.S. Cl. .................... 428/206; 156/331; 428/201; 428/204; 428/211; 428/327; 428/503; 428/530
[58] Field of Search ............... 428/503, 327, 530, 204, 428/206, 211, 201; 260/67.6 R, 29.4 R, 29.4 UA; 156/331, 313, 308

[56] References Cited

U.S. PATENT DOCUMENTS

| | | | |
|---|---|---|---|
| 2,739,081 | 3/1956 | Wohnsiedler | 428/503 |
| 3,398,018 | 8/1968 | Walters | 428/327 |
| 3,428,582 | 2/1969 | Deex | 428/476 |
| 3,450,563 | 6/1969 | Krueger | 428/327 |
| 3,479,310 | 11/1969 | Dieterich | 260/9 |
| 3,494,878 | 2/1970 | Harren | 428/327 |
| 3,557,031 | 1/1971 | Standish | 260/67.6 R |
| 3,887,637 | 6/1975 | Waitkus | 260/67.6 R |
| 3,887,743 | 6/1975 | Lane | 428/503 |

*Primary Examiner*—Ellis Robinson
*Attorney, Agent, or Firm*—Frank M. Van Riet

[57] ABSTRACT

A heat and pressure consolidated structure comprising, in superimposed relationship,
(A) a self-supporting substrate and
(B) a decorative, α-cellulose paper sheet impregnated with a resin composition comprising a mixture of a melamine/formaldehyde resin and an elastomer comprising either an ethylene/vinyl chloride copolymer containing amide groups or a polyurethane resin containing carboxyl groups, is disclosed.

10 Claims, No Drawings

ELASTOMER MODIFIED MELAMINE RESIN CONTAINING LAMINATES

BACKGROUND OF THE INVENTION

The production of decorative surfaced panels designed for such applications as furniture and vertical surfaces where exceptionally high abrasion resistance is not required has increased enormously over the past decade. These panels comprise a single sheet of melamine/formaldehyde resin impregnated decorative paper which is bonded under heat and pressure to a substrate, usually particleboard, of about ¼ to about 1 inch in thickness. These products, because they are produced at low pressures, i.e., about 300 psi, and at very short cure cycles, i.e., 2–3 minutes, are relatively inexpensive and have a good appearance and stain resistance.

Abrasion resistance thereof is, however, often poor and attempts have been made to improve the property by providing a layer of clear, unfilled melamine/formaldehyde resin on top of the decorative sheet. While these panels have proven very successful in that the abrasion resistance is adequately elevated, they deteriorate when subjected to humidity conditions encountered in normal use.

This deterioration manifests itself as surface cracks in the panel after it is subjected to low humidity. The cracks are believed to be a result of the dimensional instability of the melamine/formaldehyde resin. These resins undergo dimensional changes owing (1) to loss of water during curing, (2) to cooling after release from the panel press and (3) to loss or gain of water during subsequent exposure to the environment. The dimensional changes are often enough to strain the resin to failure, thus forming cracks. The decorative cellulosic sheet aids in the resistance of the panel to cracking, but its effectiveness is limited by the need for a resin-rich surface to impart abrasion resistance.

Known additives which generally have been added to melamine/formaldehyde resins (such as sucrose, pentaerythritol sebacate etc.) so as to react with the resin and reduce the tightness of cross-linking usually associated with brittleness do not prevent cracking to a satisfactory degree.

It is therefore clear that there remains a need for a decorative panel which will not crack when it is subjected to low humidity, will exhibit excellent abrasion resistance and will still retain other desirable properties of low-pressure panels per se, including transparency and resistance to heat and staining.

SUMMARY OF THE INVENTION

We have now discovered a novel heat and pressure consolidated decorative surfaced panel which will not crack at its surface upon subjection thereof to low humidity, and further exhibits heat resistance, transparency and abrasion resistance.

These results are achieved by the incorporation of fine particles of an elastomer latex into the melamine/formaldehyde resin which is impregnated into the decorative sheet. Although not wishing to be bound by any specific theory as to why the instant laminates possess the properties that they do, the following discussion is believed particularly pertinent.

It is generally well founded that when a glassy polymer, such as a melamine/formaldehyde resin, is stressed sufficiently either in impact or in tension, crazes and cracks develop. A craze differs from a small crack in that a craze is partially filled with a network of polymer molecules pulled from the walls and serving as a potential healing mechanism. Crazes are usually initiated by high local stress concentrations in the vicinity of flaws or crack tips. Rate of craze growth depends on the fracture energy of the resin, the applied forces and the temperature. If liquids are present, they may diffuse to the craze front, plasticize the area and assist in craze growth. Ultimately, fracture results from the breaking of the crazed material.

Elastomeric particles, on the other hand, can prevent failure by either or both of two general mechanisms. By the first mechanism, the distorted stress field around each particle initiates microcrazes. These microcrazes multiply and grow, but large amounts of energy are absorbed and a stabilized network soon forms. The system thus supports a higher elongation than in the absence of particles and returns, on release of stress, to its original state. By the second mechanism, which may operate independently, the stress field causes shear bands to develop from the particles into the matrix. Shear banding is a form of yielding and orientation usually accompanied by strain hardening. Thus a stabilized network forms in this case as well.

It thus appears probable that the elastomers incorporated into the melamine/formaldehyde resin function as described above to reduce craze and cracks when the decorative panels are produced from the resin-elastomer impregnated cellulosic sheets and utilized at low humidity.

Mixtures of melamine/formaldehyde resins and rubbery polymers have been known in the art, see British Provisional Specification No. 16737/72, dated Apr. 11, 1972, but said specification does not disclose the resin-elastomer compositions from which the instant laminates are produced.

DESCRIPTION OF THE INVENTION INCLUDING PREFERRED EMBODIMENTS

The heat and pressure consolidated structure of the instant invention comprises, in superimposed relationship,
 (A) a self-supporting substrate and
 (B) a decorative paper sheet impregnated with a composition comprising a mixture of
  (1) a melamine/formaldehyde resin syrup and
  (2) an elastomer comprising
   (a) an ethylene/vinyl chloride copolymer containing amide groups or
   (b) a polyether based, polyurethane resin containing carboxyl groups.

The melamine/formaldehyde resin syrups useful herein are well known to those skilled in the art. They are generally prepared by adding water, melamine crystal, formaldehyde, usually used as a 37% solution in water, and other additives in minor amounts, to water in mole ratios of melamine to formaldehyde of from about 1:1.6 to about 1:2.5 and allowing the reaction to proceed at about 75°–90° C. for 5–12 hours. Sufficient material is added to produce a resin solids content of from about 40 to about 75%, preferably from about 50 to about 65%, in the resultant aqueous solution.

The elastomer component is added to the melamine/formaldehyde resin in such a quantity so as to result in a solids content of the elastomer of from about 2.5 to about 30.0%, preferably from about 5.0 to about 25.0%, by weight, based on the total weight of the melamine/formaldehyde resin solids.

The elastomer is preferably added to the melamine/formaldehyde resin solution as small particles and usually in latex form. The particle size in most instances should not exceed about 4,000 A; however, it is possible, in some cases, to utilize elastomers having a particle size, on the average, of up to about 20,000 A. Where it is required that the compositions produce a transparent system, e.g., in the production of decorative panels of a specific color or having a specific decorative pattern or design on the decorative layer, it is preferred that the elastomeric additive have a particle size of less than about 1,000 Angstroms. Alternatively, haziness can be reduced, i.e., transparency can be achieved, by matching the refractive index of the elastomer to that of the melamine/formaldehyde resin. The combination of a particle size less than about 1,000 Angstroms and a matching refractive index will, of course, further enhance the usefulness of the elastomer.

Examples of elastomeric materials which have been found to be effective in producing useful compositions include the ethylene/vinyl chloride polymers having available reactive amide groups. These copolymers are well known in the art and contain from about 20 to about 30% ethylene, from about 65 to about 80% vinyl chloride and from about 0.5 to about 7%, preferably from about 1.0 to about 5.0% amide groups, said percentages totaling 100% and being, by weight, based on the total weight of the elastomer. The amide functionality can be imparted to the ethylene/vinyl chloride copolymer in any manner known to those skilled in the art such as by copolymerization thereof with amide containing vinyl monomers, e.g., acrylamide, methacrylamide and the like, see U.S. Pat. No. 3,428,582 incorporated herein by reference.

The useful polyurethane elastomers are governed only by their ability to either dissolve in water or to form a latex. That is to say, if the polyurethane elastomer is per se water-soluble, it can be added as such to the aqueous melamine/formaldehyde resin solution and produce a composition which may be used to prepare a useful laminate. Alternatively, if the polyurethane elastomer is capable of being formed into a latex, the latex can be added to the aqueous melamine/formaldehyde resin solution and the elastomer will, of course, remain dispersed therein. The resultant dispersion can then be used to impregnate a decorative sheet and form a decorative panel.

The polyurethane resin can therefore be produced by reacting such polyols as those having a molecular weight of from about 400 to about 5,000, preferably from about 600 to about 3,000, with an isocyanate. Useful polyols include those produced from diols such as the polyoxyalkylene adducts of diols and alkylene oxides such as ethylene oxide, propylene oxide, butylene oxide, mixtures thereof and the like. Useful diols include ethylene glycol, 1,2-propylene glycol, 1,3-propylene glycol, 1,2-butanediol, 1,4-butanediol, 1,6-hexanediol, hydroquinone, bisphenol A and the like.

Typical polyoxyalkylene diols include polyethyleneether glycol, polypropyleneether glycol, polytetramethyleneether glycol and the like.

Polyoxyalkylene arylene diols which also have molecular weights ranging from about 400 to about 5,000 but which differ from the above-described polyoxyalkylene diols in having arylene radicals, such as phenylene, naphthylene and anthrylene radicals, either unsubstituted or substituted, e.g., with alkyl or aryl groups, and the like, in place of some of the alkylene radicals of said polyoxyalkylene diols may also be employed. Polyoxyalkylenearylene glycols of the type ordinarily used for this purpose will usually contain at least one alkylene ether radical having a molecular weight of about 200 for each arylene radical present.

Essentially linear polyesters constitute another class of reactive organic diols which may be employed in preparing urethane prepolymers used in the present invention. While the preparation of polyesters suitable for this purpose has been described in great detail in the prior art and forms no part of the present invention per se, it may be mentioned here by way of illustration that polyesters of this type may be prepared by the condensation of a dihydric alcohol, generally a saturated aliphatic diol such as ethylene glycol, propanediol-1,2, propanediol-1,3, butanediol-1,4, pentanediol-1,2, pentanediol-1,5, hexanediol-1,3, hexanediol-1,6, diethylene glycol, dipropylene glycol, triethylene glycol, tetraethylene glycol, and the like, as well as mixtures of such diols with each other, and the like, with a dicarboxylic acid, e-caprolactone, or anhydride which is either saturated or which contains only benzenoid unsaturation, such as oxalic, malonic succinic, glutaric, adipic, pimelic, suberic, azelaic, terephthalic, sebacic, malic, phthalic, cylohexanedicarboxylic and endomethylenetetrahydrophthalic acid, and the like, and their isomers, homologs, and other substituted derivatives, e.g., chloro derivatives. The linear polyesters used in preparing the urethane prepolymers also have molecular weights ranging from about 400 to about 5,000. In addition, they generally have relatively low acid numbers, e.g., acid numbers not appreciably in excess of about 60 and preferably as low as can be practicably obtained, e.g., 2 or less. Correspondingly, they have relatively high hydroxyl numbers, e.g., from about 20 to about 300. When preparing these polyesters, an excess of diol over dicarboxylic acid is generally used.

As can be readily appreciated, mixtures of the various reactive organic diols described hereinabove may also be employed in preparing the urethane prepolymers useful in the present invention.

The organic diisocyanates which can be employed to produce the urethane used in the present invention include, for example, the aliphatic, cycloaliphatic and aromatic diisocyanates including m-xylene diisocyanate, methylenediisocyanate, tetramethylene diisocyanate, hexamethylene diisocyanate, 4,4'-methylenebis(-cyclohexyl isocyanate), 4-chloro-m-phenylene diisocyanate, isophorone diisocyanate, o-, p- or m-phenylene diisocyanate, trimethylhexamethylene diisocyanate, 4-t-butyl-m-phenylene diisocyanate, 4,4'-methylene bis(phenyl isocyanate), tolylene diisocyanate, 1,5-naphthalene diisocyanate, 4-methoxy-m-phenylene diisocyanate, biphenylene diisocyanate, cumene-2,4-diisocyanate, 3,3'-dimethyl-4,4'-biphenylene diisocyanate, p,p'-diphenylene diisocyanate, 3,3'-dimethoxy-4,4'-biphenylene diisocyanate, mixtures thereof and the like.

The polyol may be reacted with the diisocyanate in the presence of a suitable catalyst such as an organotin compound, e.g., dibutyltin dilaurate, dibutyltin octoate and the like; a tertiary amine, e.g., triethylene diamine; an organolead compound, e.g., lead octoate and the like, at concentrations of from about 0.001 to about 0.1%, by weight, based on the total weight of the polyol and diisocyanate. The reaction is allowed to proceed at a temperature of from about 60° to about 180° C. until the isocyanate terminated urethane prepolymer forms, i.e., from about 4 to about 24 hours.

As mentioned above, in order for the polyurethane elastomer to be useful, it must contain carboxyl groups. These carboxyl groups, present in the elastomer in a concentration of about 3.0 to 10.0%, by weight, based on the total weight of the elastomer, are incorporated into the elastomer by replacing an equivalent amount of the above-mentioned polyol with a polyol containing at least one carboxyl group. Suitable compounds conforming to this description are 2,2-dimethylol propionic acid, tartaric acid, glyceric acid, bis(hydroxymethyl)benzoic acid, bis(hydroxymethyl)cyclohexane carboxylic acid and the like. U.S. Pat. No. 3,479,310, also incorporated herein by reference, teaches the production of such carboxyl containing polyurethanes.

The compositions are then prepared by blending the elastomer per se, or after having emulsified it with a suitable amine such as triethanol amine, N-methyl morpholine, tetramethyl ammonium hydroxide, triethylamine, tetrabutylammonium hydroxide, and the like, with the aqueous melamine/formaldehyde resin solution, with stirring for from about 3–15 minutes. Catalyst, such as ammonium sulfate, thiourea, hydrochloric acid, sulfuric acid, formic acid, acetic acid, oxalic acid, sodium hydroxide, potassium hydroxide, sodium carbonate and the like, can be added at this time to regulate subsequent cure rate of the melamine/formaldehyde resin when the B-staged decorative sheet containing it is heat and pressure consolidated into the decorative panel. The use of a strong acid catalyst when a basic emulsifier is used to produce the elastomer latex should be avoided.

The aqueous melamine/formaldehyde resin solution can be used as such or the resin itself and/or the solution, often times called a "syrup", may be further modified by the addition of known additives thereto.

The blending of the prepared elastomer with the melamine/formaldehyde resin solution is the preferred manner in which the compositions may be prepared. It is also possible, however, to form the elastomer in situ in the melamine/formaldehyde solution by incorporating therein a solution of the elastomer components and then forming the elastomer during the melamine/formaldehyde precuring operation and/or the decorative panel production.

The decorative papers from which the novel low-pressure panels of the present invention are preferably produced are made from bleached wood pulp which is high, at least about 60%, in alpha cellulose content. The papers are pigmented in a known manner to obtain the desired levels of color and opacity. They generally have a basis weight of at least about 40 pounds per 3,000 square foot ream. The paper should have controlled pH of about that of the melamine/formaldehyde resin due to the influence pH has on the reaction rate of the melamine resin after it is applied thereto.

The decorative surface paper porosity (Gurley) is preferably controlled to assure proper treating of the paper with the resin and pressing of the panel. A paper having too high a porosity will allow too much resin to penetrate while a paper with too low a porosity will not enable sufficient resin to penetrate.

Impregnation of the paper and drying of the impregnated paper may be effected by conventional treaters and driers at e.g., 80°–125° C. for 3–50 minutes. Treaters which have been found to be particularly useful in this regard achieve a high resin pick-up and uniform surface coating with sufficient surface resin to achieve an acceptable abrasion resistance. The impregnated paper generally contains at least about 40% resin, by weight, based on the weight of the impregnated paper.

Core material, i.e., self-supporting substrates useful in producing the decorative low-pressure panels include medium density, mat-formed, wood particleboard and medium density, wood fiberboard. Useful core material, however, merely must enable the production of full-sized, smooth-faced, well bonded, crack and craze resistant panels. Core materials should be stored for a sufficient time at ambient conditions to achieve an equilibrium temperature and an equilibrium moisture content.

The decorated layer may be placed on both sides or only on one side of the self-supporting substrate when panels are being produced. If the decorative sheet is placed only on one side of the substrate, it is preferred that a so-called balance sheet, i.e., a melamine/formaldehyde resin impregnated paper sheet, e.g., of kraft or other paper, sometimes called a cabinet liner, be placed on the other side in order to prevent the resultant panel from warping during pressing.

Typical release sheets can be applied to both the decorative layer and the balance sheet to prevent the press plate from sticking thereto.

Various finishes may be applied to the decorative panels of the present invention. For example, the surface may be rendered glossy by using a highly polished press plate, matte by interposing a texturizing release sheet between the press plate and the decorative sheet or embossed by using an etched press plate.

The following examples are set forth for purposes of illustration only and are not to be construed as limitations on the present invention except as set forth in the appended claims. All parts and percentages are by weight unless otherwise specified.

The Taber abrasion Resistance Test mentioned below is specifically detailed in N.E.M.A. Standards Publication "Laminated Thermosetting Decorative Sheets", Standard #LD1-2,01 "Method of Test of Resistance of Surface to Wear".

EXAMPLE A

Preparation of a Polyurethane Emulsion

To a suitable reaction vessel equipped with stirrer, thermometer, $N_2$ gas inlet and vacuum adapter are added 44.2 parts of polytetramethylene glycol having a molecular weight of 2,000 and 11.9 parts of 2,2-bis(hydroxymethyl)propionic acid. The vessel is heated to 100° C. and a 1–2 mm. Hg. pressure for 2 hours to dry the glycol and acid. A blanket of nitrogen gas is then maintained over the vessel contents and the vessel is cooled to 40° C. 43.9 parts of toluene diisocyanate are then added and the exotherm is controlled at 80° C. for 8 hours. The vessel is then cooled to 60° C. and the resultant polyurethane polymer is transferred to a second vessel and sealed under nitrogen.

To a third vessel are added 7.0 parts of triethanol amine, as an emulsifier, in 90 parts of water. The vessel is cooled to 4° C. The cooled solution is transferred to a fourth vessel which has been cooled to 0° C. and is equipped with vigorous agitation means. The solution is vigorously agitated and 30.0 parts of the above-prepared polyurethane polymer are heated to 100° C. and added to the vortex of the agitating solution in a continuous stream. When addition is complete, 10.0 parts of chipped ice are added and stirring is continued 1 minute. Another 10.0 parts of chipped ice are added and the media is again agitated for 1 minute. The vessel contents are then transferred to a suitable container, cooled to <10° C. and stirred for 5 hours while the temperature slowly rises to ambient. A clear, blue opalescent emulsion of 25% solids is recovered. Small amounts of coagulum which may be present therein are removed by filtering the emulsion through No. 1 Whatman paper. The average particle size of the elastomer is less than 1,000 Angstroms.

EXAMPLE 1

100 Parts of a commercially available 1:1.8 melamine/formaldehyde resin syrup (58% solids) are added to a suitable reaction vessel. The liquid is stirred and 0.05 part of ammonium sulfate catalyst is added thereto. To the resultant mixture are then added 34.8 parts of the polyurethane emulsion of Example A. Stirring is continued for 5 minutes. A stable emulsion is recovered.

A large section of woodgrained print paper is impregnated with the resultant stable emulsion. The impregnated sheet is precured and the precured paper sheet is then placed atop a particleboard section of the same size with the decorative side up and a release sheet is placed on top of the decorative side thereof. The assembly is placed between 2 steel press plates, slid into a hydraulic press heated to a platen temperature of about 155° C. and pressed at 250–350 psi for 2–3 minutes. The resulting surface layer of polyurethane modified resin is transparent and about 45μ thick. The panel is removed from the press and tested.

The low himidity cracking resistance thereof is determined by placing the decorative panel into an indicating CaSO$_4$ conditioned desiccator at 0% R.H. and counting cracks formed at intervals during 30 days through a stereomicroscope.

Abrasion resistance is determined as set forth above. The Taber cycles to 50% print erasure are 250. No cracks appear after 30 days.

EXAMPLES 2 – 16

Following the procedure of Example 1, additional decorative panels are prepared. The thickness of the resin layers is varied as is the percentage of the polyurethane. The results are set forth in Table I, below.

TABLE I

| Example | % Polyurethane | Surface Resin Thickness μ | Taber Cycles to 50% Print Erasure | No. Cracks after 30 days at 0% R.H. |
|---|---|---|---|---|
| 2 | 21 | 35 | 370 | 0 |
| 3 | 5 | 25 | 300 | 0 |
| 4 | 10 | 45 | 350 | 0 |
| 5 | 10 | 20 | 200 | 0 |
| 6 | 10.8 | 25 | 200 | 0 |
| 7 | 10.8 | 15 | 170 | 0 |
| 8 | 8.9 | 20 | 230 | 0 |
| 9 | 10.8 | 45 | 330 | 0 |
| 10 | 7.5 | 45 | 310 | 0 |
| 11(comp) | 0 | 0 | 70 | 0 |
| 12(comp) | 0 | 8 | 80 | 20 |
| 13(comp) | 0 | 30 | 350 | 50 |
| 14(comp) | 0 | 45 | 310 | >50 |
| 15(comp) | 0 | 35 | 350 | >50 |
| 16(comp) | 0 | 40 | 360 | >50 |

EXAMPLE 17

Again following the procedure of Example 1 except that 10% of a commercially available ethylene/vinyl chloride (18/77) copolymer containing 5% amide functionality is used instead of the polyurethane, a smooth, clear film results on the decorative panel. The average particle size of the copolymer is about 775 A. Precuring followed by laminating as described in Example 1 results in panels having a Taber value of 140–170. No cracks are observed after 40 days at 0% R.H. The decorative pattern is readily observable.

EXAMPLE 18

The procedure of Example 1 is again followed except that a commercially available poly(ethylene adipate) of 1700 molecular weight and having terminal hydroxyl groups is used as the polyol. Similar results are achieved, the polyurethane elastomer having been added to the melamine/formaldehyde resin solution by suspending it in the aqueous phase thereof. Particle size of the urethane is about 1,000 Angstroms.

EXAMPLE 19

A bisphenol A-ethylene oxide adduct of 2,800 molecular weight is used as the polyol in place of that of Example 1. Again an excellent decorative panel with no cracks after 35 days at 0% R.H. is produced. The particle size of the polyurethane is about 1,500 Angstroms.

EXAMPLE 20

The procedure of Example 1 is again followed except that the particle size of the elastomer in the emulsion is about 3,800 Angstroms and a white decorative sheet is used. A panel having excellent crack resistance at 0% R.H. and a somewhat cloudy surface is produced.

We claim:
1. A heat and pressure consolidated article comprising
   (A) a self-supporting substrate and
   (B) a decorative, cellulosic paper sheet having a basis weight of at least about 40 pounds per 3,000 square foot ream, containing at least about 60% α-cellulose and being impregnated with a composition of matter comprising a mixture of
      (1) an aqueous melamine/formaldehyde resin solution wherein the melamine to formaldehyde ratio thereof ranges from about 1:1.6 to about 1:2.5 and
      (2) from about 2.5 to about 30.0%, by weight, based on the weight of the resin solids of (1), of an elastomer comprising
         (a) an ethylene/vinyl chloride copolymer containing a comonomer supplying from about 0.5 to about 7.0%, by weight, based on the total weight of (a), of amide groups or
         (b) a polyurethane resin containing from about 3.0 to about 10.0%, by weight, based on the total weight of (b), of carboxyl groups, said elastomer having a particle size of up to about 20,000 Angstroms.

2. An article according to claim 1 wherein the percentage of said (2) ranges from about 5.0% to about 25.0%, by weight, same basis.

3. An article according to claim 1 wherein said elastomer has a particle size of up to about 4,000 Angstroms.

4. An article according to claim 1 wherein said elastomer has a particle size of up to about 1,000 Angstroms.

5. An article according to claim 1 wherein said elastomer is (a).

6. An article according to claim 1 wherein said elastomer is (b).

7. An article according to claim 1 wherein said (a) contains from about 1.0 to about 5.0%, by weight, same basis, of amide groups.

8. An article according to claim 5 wherein said elastomer contains from about 1.0 to about 5.0%, by weight, same basis, of amide groups, has a particle size of up to about 1,000 Angstroms and is present in a range of from about 5.0 to about 25.0%, by weight, same basis.

9. An article according to claim 6 wherein said elastomer has a particle size of up to about 1,000 Angstroms and is present in a range of from about 5.0 to about 25.0%, by weight, same basis.

10. A method for the production of the article of claim 1 which comprises heat and pressure consolidating, in superimposed relationship,
(A) a self-supporting substrate and
(B) a decorative, cellulosic paper sheet having a basis weight of at least about 40 pounds per 3,000 square foot ream, containing at least about 60% $\alpha$-cellulose and being impregnated with a composition of matter comprising a mixture of
  (1) an aqueous melamine/formaldehyde resin solution wherein the melamine to formaldehyde ratio thereof ranges from about 1:1.6 to about 1:2.5 and
  (2) from about 2.5 to about 30.0%, by weight, based on the weight of the resin solids of (1), of an elastomer comprising
    (a) an ethylene/vinyl chloride copolymer containing a comonomer supplying from about 0.5 to about 7.0%, by weight, based on the total weight of (a), of amide groups or
    (b) a polyurethane resin containing from about 3.0 to about 10.0%, by weight, based on the total weight of (b) of carboxyl groups,
said elastomer having a particle size of up to about 20,000 Angstroms, and recovering the resultant product.

* * * * *